United States Patent
Singh et al.

(10) Patent No.: US 6,185,345 B1
(45) Date of Patent: Feb. 6, 2001

(54) ULTRA-STABLE OPTICAL WAVELENGTH DIVISION MULTIPLEXER/DEMULTIPLEXER

(75) Inventors: Harmeet Singh; Fahri Diner, both of Boca Raton, FL (US)

(73) Assignee: Qtera Corporation, Boca Raton, FL (US)

(*) Notice: Under 35 U.S.C. 154(b), the term of this patent shall be extended for 0 days.

(21) Appl. No.: 09/271,524

(22) Filed: Mar. 18, 1999

(51) Int. Cl.[7] ................................................ G02B 6/28
(52) U.S. Cl. ................ 385/24; 385/43; 385/16; 385/14; 359/124
(58) Field of Search ........................... 385/24, 43, 16, 385/14, 12, 15, 27, 28, 42, 2; 359/124, 173, 127, 130, 129, 123, 128, 138

(56) References Cited

U.S. PATENT DOCUMENTS

| | | | |
|---|---|---|---|
| 5,048,909 | 9/1991 | Henry | 385/27 |
| 5,459,801 | 10/1995 | Suizer | 385/30 |
| 5,633,965 | 5/1997 | Bricheno et al. | 385/37 |
| 5,636,309 | 6/1997 | Henry et al. | 385/129 |
| 5,647,037 | 7/1997 | Byron | 385/27 |
| 5,703,976 | 12/1997 | Cullen | 385/28 |
| 5,761,351 | 6/1998 | Johnson | 385/15 |
| 5,809,190 | * 9/1998 | Chen | 385/43 |
| 5,930,414 | 7/1999 | Fishman et al. | 385/11 |

FOREIGN PATENT DOCUMENTS 0778479    12/1996    (EP).

OTHER PUBLICATIONS

Article entitled "Fused Coupler Technology for DWMD Applications", Gpnthier, Fiber Optic Product News, Sept., 1998, pp. 54 and 56.

* cited by examiner

Primary Examiner—Phan T. H. Palmer
(74) Attorney, Agent, or Firm—Hunton & Williams

(57) ABSTRACT

An unbalanced Mach-Zehnder interferometer is useable in an optical wavelength division multiplexer or demultiplexer to provide wavelength stability. First and second fused tapered couplers in the unbalanced Mach-Zehnder interferometer are each responsive to the reception of at least one first and second optical input signals for generating separate predetermined first and second optical output signals. The first and second output signals from the first fused tapered coupler are coupled via first and second optical waveguides, respectively, to respective first and second optical inputs of the second fused tapered coupler. First and second output signals from the second fused tapered coupler are provided as first and second output signals from the unbalanced Mach-Zehnder interferometer. A variable delay is coupled in one of the first and second waveguides coupling the first and second optical output signals from the first fused tapered coupler to the first and second optical inputs of the second fused tapered coupler for introducing a predetermined variable delay into an optical signal passing therethrough for maintaining a relative delay between the first and second waveguides at a constant value. A plurality of such Mach-Zehnder interferometers can be used to form cascaded stages of an optical wavelength division multiplexer or demultiplexer.

17 Claims, 4 Drawing Sheets

ULTRA-STABLE OPTICAL WAVELENGTH DIVISION MULTIPLEXER/DEMULTIPLEXER

FIELD OF THE INVENTION

The present invention relates to method and apparatus for providing ultra-stable optical wavelength division multiplexing and/or demultiplexing.

BACKGROUND OF THE INVENTION

The implementation of a low cost, low insertion loss, dense wavelength division multiplexer (DWDM) or demultiplexer (DWDD) is of great advantage in high capacity optical systems. Unfortunately, most DWDM of DWDD devices have high insertion loss or high cost associated with them.

U.S. Pat. No. 5,809,190 (Chen), issued on Sept. 15, 1998, discloses an unbalanced Mach-Zehnder (UMZ) interferometer capable of accomplishing dense wavelength division (DWD) multiplexing with low insertion loss. More particularly, Chen discloses apparatus and method of making a fused dense wavelength division multiplexer (DWDM) using a fused-biconical taper technique. The DWDM comprises multiple Multi-window Wavelength Division Multiplexers (MWDMs) which are cascaded in several stages where the MWDMs in each stage have an identical window spacing. For an N-channel DWDM, there are a predetermined plurality of DWDMs in each stage, and the stages are cascaded to form the MWDM. Unfortunately, the UMZ is by nature sensitive to temperature fluctuations of the environment, and typical temperature fluctuations expected in the terminal environment can render the DWDM device unusable. Therefore, the disclosed UMZ device is unstable because of the occurrence of variations in phase due to temperature fluctuations. A similar device is also discussed in an article titled "Fused-Coupler Technology for DWDM Applications" by F. Gonthier in the magazine *Fiber Optic Product News*, September 1998, at pages 54 and 56.

U.S. Pat. No. 5,647,037 (Byron), issued on Jul. 8, 1997, discloses an optical band-pass filter with tunable performance achieved by adding a variable time delay in one of two output legs of a 3 dB splitter. Both output legs containing separate matched Bragg grating reflectors at separate predetermined distances from a central optical coupling region of the filter to reduce any noise component in a channel signal by a predetermined amount. The optical filter is able to redirect the channel signal into either a launch leg or a band-pass leg of the filter. The filter, however, does not provide for any compensation for variations in phase due to environmental fluctuations.

It is desirable to provide an ultra-stable optical wavelength division multiplexing and/or demultiplexing arrangement to automatically compensate for any change in signal drift and/or transmission properties of an included filter.

SUMMARY OF THE INVENTION

The present invention is directed to method and apparatus for providing ultra-stable optical wavelength division multiplexing (WDM) and/or demultiplexing by automatically compensating for any change in signal drift and/or transmission properties in a WDM multiplexer or demultiplexer.

Viewed from one aspect, the present invention is directed to an unbalanced Mach-Zehnder interferometer for use in, for example, an optical wavelength division multiplexer or demultiplexer. The unbalanced Mach-Zehnder interferometer comprises first and second fused tapered couplers, and a variable delay providing means. Each of the first and second fused tapered couplers are responsive to the reception of at least one first and second optical input signals for generating separate predetermined first and second optical output signals. The first and second output signals from the first fused tapered coupler are coupled via first and second optical waveguides, respectively, to respective first and second optical inputs of the second fused tapered coupler. First and second output signals from the second fused tapered coupler are provided as first and second output signals from the unbalanced Mach-Zehnder interferometer. The variable delay providing means is coupled in one of the first and second waveguides coupling the first and second optical output signals from the first fused tapered coupler to the first and second optical inputs of the second fused tapered coupler. The variable delay providing means introduces a predetermined variable delay into an optical signal passing therethrough for maintaining a relative delay between the first and second waveguides at a constant value.

Viewed from another aspect, the present invention is directed to an optical wavelength division multiplexer or demultiplexer comprising a plurality of unbalanced Mach-Zehnder interferometers located in a plurality of stages of a cascading arrangement. Each unbalanced Mach-Zehnder interferometer comprises a first fused tapered coupler, a second fused tapered coupler, and a variable delay providing means. The first fused tapered coupler is responsive to the reception of at least one of first and second optical input signals for generating separate predetermined first and second optical output signals for transmission via first and second optical waveguides, respectively. The second fused tapered coupler is responsive to the reception of the first and second optical output signals from the first fused tapered coupler which are received at first and second optical inputs, respectively, from the respective first and second optical waveguides, for generating separate predetermined first and second optical output signals from the unbalanced Mach-Zehnder interferometer. The variable delay providing means is coupled in one of the first and second waveguides coupling the output signals from the first fused tapered coupler to the first and second optical inputs of the second fused tapered coupler for introducing a predetermined variable delay into the associated optical output signal from the first fused tapered coupler passing therethrough for maintaining a relative delay between the first and second waveguides at a constant value.

Viewed from still another aspect, the present invention is directed to a method of providing a unbalanced Mach-Zehnder interferometer that compensates for signal drift. In a first step, at least one of first and second optical input signals are received at a first fused tapered coupler for generating separate predetermined first and second optical output signals for transmission via first and second optical waveguides, respectively. In a second step, the first and second optical output signals generated by the first fused tapered coupler in step (a) are received at first and second optical inputs, respectively, of a second fused tapered coupler from the respective first and second optical waveguides. The second fused tapered coupler generates separate predetermined first and second optical output signals which are output signals from the unbalanced Mach-Zehnder interferometer. In a third step, a predetermined variable delay is introduced into one of the first and second optical output signal from the first fused tapered coupler generated in the first step in a variable delay providing means. The variable delay that is introduced maintains a relative delay between the first and second waveguides coupling the first and second output signals from the first fused tapered coupler to the first and second optical inputs of the second fused tapered coupler at a constant value.

The invention will be better understood from the following more detailed description taken with the accompanying drawings and claims.

DETAILED DESCRIPTION

Figure 1:
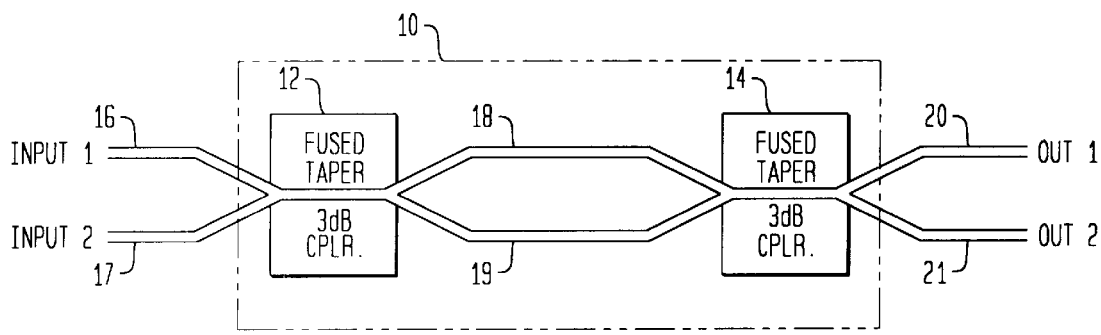
FIG. 1 shows a block diagram of a prior art unbalanced Mach-Zehnder interferometer.

Referring now to FIG. 1 there is shown a prior art unbalanced Mach-Zehnder multi-wavelength interferometer or filter 10 (shown within a dashed line rectangle) comprising first and second fused taper 3 dB couplers (CPLR.) 12 and 14. Each of the two fused taper couplers 12 and 14 is formed by, for example, heating two optical fibers (e.g., optical fibers 16 and 17) and fusing a section thereof together while tapering the fused section to a central point before dividing again. Alternatively, the fused tapered couplers 12 and 14 can be formed from planar waveguides to obtain a similar structure. The first fused taper coupler 12 is coupled to receive first and second optical input signals (INPUT 1 and 2) via optical fibers 16 and 17, respectively. After passing through the first fused taper coupler 12, the resultant combined first and second output signals are transmitted via first and second optical fibers 18 and 19, respectively, for providing respective first and second input signals at separate inputs of the second fused taper coupler 14. The optical path lengths of the optical fibers 18 and 19 are have a predetermined difference and their lengths are hereinafter referred to as $L_{18}$ and $L_{19}$, respectively. After passing through the second fused taper coupler 14, the resultant combined signals are transmitted as first and second output signals (OUT 1 and 2) from the Mach-Zehnder interferometer 10 via first and second output optical fibers 20 and 21, respectively.

Based on the principles of interferometry, the transmission profiles "T" of the filter 10 in the first and second output optical fibers 20 and 21 are given by the equations:

$$T_{20}=\cos^2(\phi), \text{ and } T_{21}=\sin^2(\phi), \qquad \text{(Eq. 1)}$$

$$\phi=2\pi n\delta L/w; \qquad \text{(Eq. 2)}$$

where n is the refractive index of the interferometer medium, $\delta L$ is the relative path length difference ($\delta L=L_{19}-L_{18}$), and w is the wavelength of light.

Figure 2:
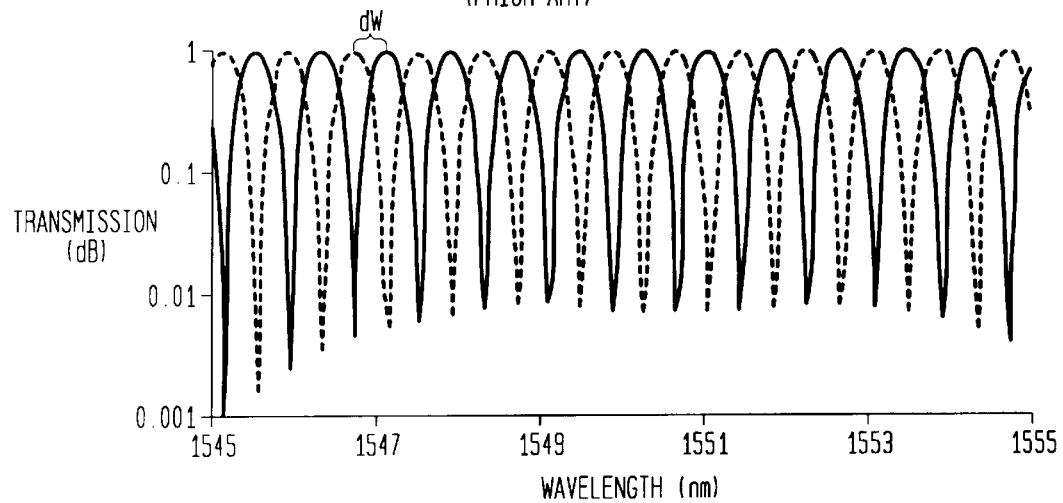
FIG. 2 graphically shows exemplary output waveforms that are obtainable from the prior art single stage Mach-Zehnder filter shown in FIG. 1.

Referring now to FIG. 2, there is graphically shown exemplary output waveforms obtained in the optical fibers 20 and 21 from the Mach-Zehnder multi-wavelength filter (interferometer) 10 of FIG. 1. The horizontal axis represents wavelength in nanometers (nm), and the vertical axis represents transmission in decibels (dB). The solid waveform represents the exemplary waveform obtained in the output optical fiber 20, and the dashed line waveform represents the exemplary waveform obtained in the output optical fiber 21. The waveforms for the optical fibers 20 and 21 are complementary to each other as is shown in Equation (1), and the peaks are separated by $\delta w$, where w is the wavelength of light and $\delta w$ is given by the equation $$\delta w=w_2/(2n\delta L). \qquad \text{(Eq. 3)}$$

The filtering property of a Mach-Zehnder interferometer 10 can be exploited to separate densely packed signals at different wavelengths by cascading Mach-Zehnder interferometers with different $\delta w$'s.

Figure 3:
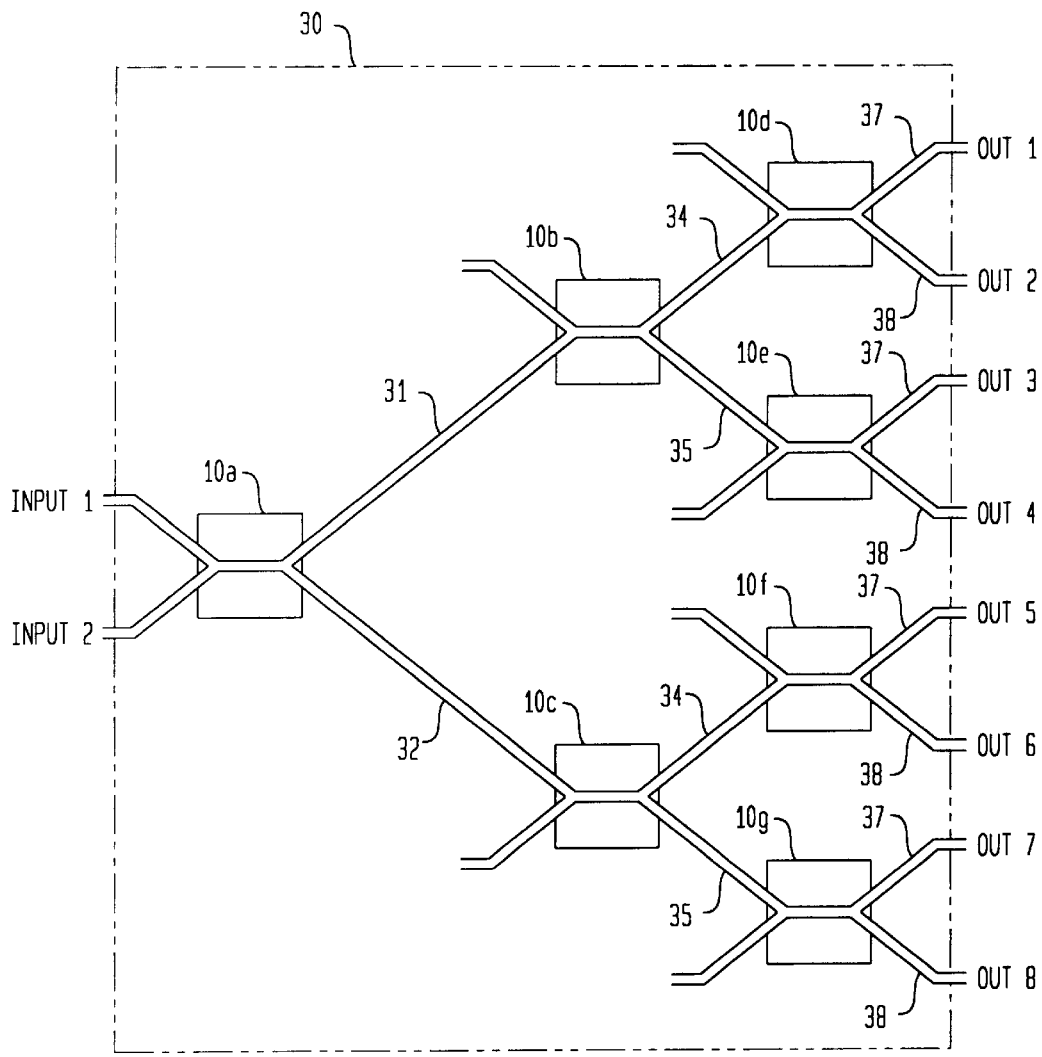
FIG. 3 shows a block diagram of a Dense Wavelength Division Multiplexer/Demultiplexer found in the prior art including cascaded Mach-Zehnders interferometers for separating eight signals received in a wavelength division multiplexed signal.

Referring now to FIG. 3, there is shown an exemplary Dense Wavelength Division Multiplexer (DWDM) or Demultiplexer 30 (shown within a dashed line rectangle) found in the prior art comprising a cascading of unbalanced Mach-Zehnder interferometers 10a–10g. A first stage of the cascaded arrangement comprises the Mach-Zehnder interferometer 10a which is capable of receiving first and second input signals and generate first and second output signals via optical waveguides 31 and 32, respectively. A second stage of the cascaded arrangement comprises the Mach-Zehnder interferometers 10b and 10c. The interferometer 10b is coupled to receive the first output from the interferometer 10a via the optical waveguide 31 at one of its two inputs with the other input being pigtailed (unused). The interferometer 10c is coupled to receive the second output from the interferometer 10a via the optical waveguide 32 at one of its two inputs with the other input being pigtailed (unused). A first output of the interferometer 10b is coupled to one of two inputs of the interferometer 10d via an optical waveguide 34 while a second output therefrom is coupled to one of two inputs of the interferometer 10e via an optical waveguide 35. The other input of the interferometers 10d and 10e are pigtailed (unused). Similarly, a first output of the interferometer 10c is coupled to one of two inputs of the interferometer 10f via an optical waveguide 34 while a second output therefrom is coupled to one of two inputs of the interferometer 10g via an optical waveguide 35. The other input of the interferometers 10f and 10g are pigtailed (unused). First and second outputs from each of the interferometers 10d, 10e, 10f, and 10g provide separate output channel signals from the DWD Demultiplexer arrangement 30. For multiplexing eight channel signals, the DWDM arrangement 30 would be used in a reverse direction with the eight channels signal being inputted at the right side (at OUT 1 to OUT 8) of FIG. 3 and a single wavelength division multiplexed signal being generated at one of the two outputs (at INPUT 1 or 2).

In the cascading arrangement of the unbalanced Mach-Zehnder interferometers 10a–10g, the $\delta w$ (delta wavelength) of each Mach-Zehnder interferometer in a stage is adjusted to be twice that of the Mach-Zehnder interferometer(s) in a previous stage.

Figure 4:
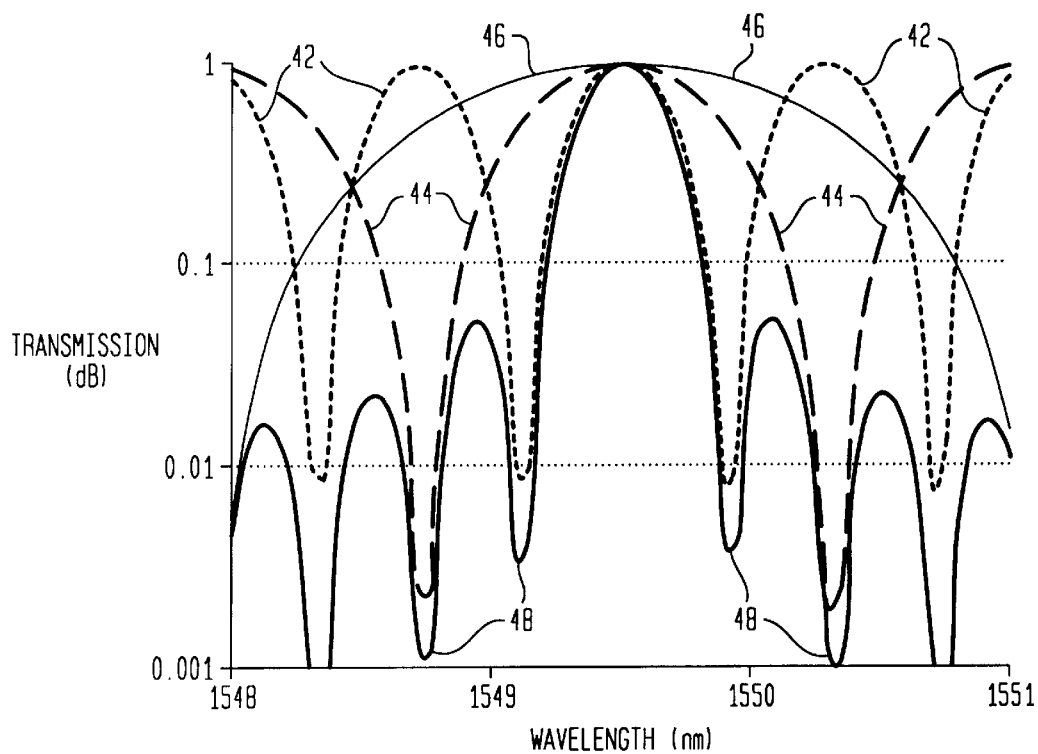
FIG. 4 graphically shows exemplary output waveforms having wavelengths between 1548 and 1551 nanometers that are obtainable from the prior art cascaded Mach-Zehnder interferometers shown in FIG. 3.

Referring now to FIG. 4, there is graphically shown enlarged exemplary output waveforms for one section of a frequency spectrum used with the prior art cascaded unbalanced Mach-Zehnder interferometers 10a–10g shown in FIG. 3. It is to be understood that the waveforms shown in FIG. 4 are essentially for one channel area and are repetitious in a corresponding manner below 1548 nm and above 1551 nm for the other channel areas. The horizontal axis represents wavelength in nanometers (nm) between 1548 and 1551 nanometers, and the vertical axis represents transmission in decibels (dB) between 0.001 and 1 decibels. From the graphical display in FIG. 4, it can be seen that cascading three levels of unbalanced Mach-Zehnder interferometers 10a–10g (as is shown in FIG. 3) can allow for the separation of eight channels when demultiplexing an input DWD multiplexed signal. The dotted line waveform 42 is representative of an output on either leg 31 or 32 of the Mach-Zehnder interferometer 10a in the first stage of the DWD demultiplexer 30, where, for example, wavelengths 1,3,5,7 are found propagating in output leg 31 and wavelengths 2,4,6,8 are found propagating in output leg 32. The dashed line waveform 44 is representative of an output on any one of the output legs 34 or 35 from the Mach-Zehnder interferometers 10b and 10c in the second stage of the cascaded Mach-Zehnder interferometers 10a–10g. More particularly, the wavelengths 1 and 5 are found propagating in output leg 34 of interferometer 10b, wavelengths 3 and 7 are found propagating in output leg 35 of interferometer 10b, the wavelengths 2 and 6 are found propagating in output leg 34 of interferometer 10c, wavelengths 4 and 6 are found propagating in output leg 35 of interferometer 10c. The solid line waveform 46 is representative of an output on any one of the output legs 37 or 38 from the Mach-Zehnder interferometers 10d, 10e, 10f, or 10c in the third stage of the cascaded Mach-Zehnder interferometers 10a–10g. The bold solid line waveform 48 is representative of an output on either leg 37 or 38 from the Mach-Zehnder interferometers 10d, 10e, 10f, or 10c in the third stage of the cascaded Mach-Zehnder interferometers 10a–10g. As was stated hereinabove, the waveforms shown in FIG. 4 are repetitious in a corresponding manner below 1548 nm and above 1551 nm so that the peak of the bold line waveform 48 corresponds to only one of the outputs from one of the Mach-Zehnder interferometers 10d, 10e, 10f, or 10g. Each of the remaining outputs from the Mach-Zehnder interferometers 10d, 10e, 10f, or 10g has a peak at a different wavelength such that a separate demultiplexed channel of a received eight-channel multiplexed signal is obtained at each output (OUT 1–OUT 8) from the cascaded unbalanced Mach-Zehnders 10a–10g in the DWDM 30. If, for example, it is assumed that wavelengths of channels 1, 3, 5, and 7 are found propagating in output leg 31 of interferometer 10a, and wavelengths of channels 2, 4, 6, and 8 are found propagating in output leg 32 of interferometer 10a, then the first and second outputs via optical waveguides 37 and 38 from interferometer 10d are the demultiplexed channel 1 and 3 signals, respectively. Similarly, the first and second outputs via optical waveguides 37 and 38 from interferometer 10e are the demultiplexed channel 5 and 7 signals, respectively, the first and second outputs via optical waveguides 37 and 38 from interferometer 10f are the demultiplexed channel 2 and 4 signals, respectively, and the first and second outputs via optical waveguides 37 and 38 from interferometer 10g are the demultiplexed channel 6 and 8 signals, respectively.

The cascade unbalanced Mach-Zehnder arrangement as is shown in FIG. 3 is suggested in U.S. Pat. No. 5,809,190 (Chen), issued on Sep. 15, 1998. There is one significant short-coming of such an unbalanced Mach-Zehnder based device. It becomes obvious from Equation 1 that the performance of such a device is based entirely on the relative optical path difference in an unbalanced Mach-Zehnder. Accordingly, if there were any conditions in the environment that would change the optical path difference in the unbalanced Mach-Zehnder, the performance of the device would also be effected. Such effects can be studied by examining the argument of the sine or cosine functions in Equation 1 as a function of an external variable $\beta$. Assuming that the external variable $\beta$ effects both the refractive index and the length of the waveguide 18 or 19, the change in the phase $\delta\phi$ can be written as, $$\delta\phi=(2\pi/w)\delta(n\delta L)=(2\pi/w)[n \cdot d\delta L/\delta\beta+\delta L \cdot dn/d\beta(dn/d\beta)]\delta\beta. \quad \text{(Eq. 4)}$$

If $\beta$ represents temperature change, then $(1/\delta L)d\delta L/d\beta$ represents a coefficient of thermal expansion, and $(1/n)dn/d\beta$ represents a thermo-optic coefficient. The effects of temperature change in a DWDM can be studied by modeling the output of a single channel in both the presence and absence of external temperature changes.

Figure 5:
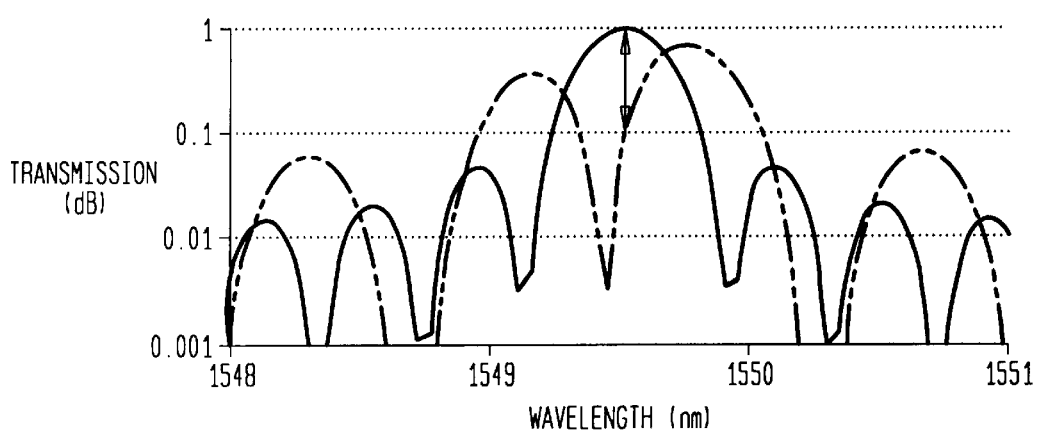
FIG. 5 graphically shows an exemplary output waveforms that 10 are obtainable for one channel from the prior art cascaded Mach-Zehnder interferometers shown in FIG. 3 with and without temperature changes.

Referring now to FIG. 5, there is shown the results of a numerical modeling of unbalanced Mach-Zehnders 10a–10g cascaded as is shown in FIG. 3 to illustrate an extraction of a single channel shown by the solid line waveform from an output leg of an eight channel device (seven cascaded unbalanced Mach-Zehnders 10a–10g). The horizontal axis represents wavelength in nanometers (nm) between 1548 and 1551 nanometers, and the vertical axis represents transmission in decibels (dB) between 0.001 and 1 decibels. If the temperature of, for example, the first unbalanced Mach-Zehnder 10a is changed by 50 degrees Centigrade (a typical temperature range obtainable in a telecommunication application), the performance of the overall DWD demultiplexer 30 of FIG. 3 suffers significantly, and the relative loss of the channel being extracted increases by 10 dB (as is indicated by a dashed line in FIG. 5). Such an extreme change in the loss of the channel renders the DWD demultiplexer 30 useless in most applications of channel separation. Furthermore, due to the complementary nature of the unbalanced Mach-Zehnder filters, the signal loss is not dissipated, but redirected to a different channel leading to deleterious cross talk and signal degradation in other channels.

Figure 6:
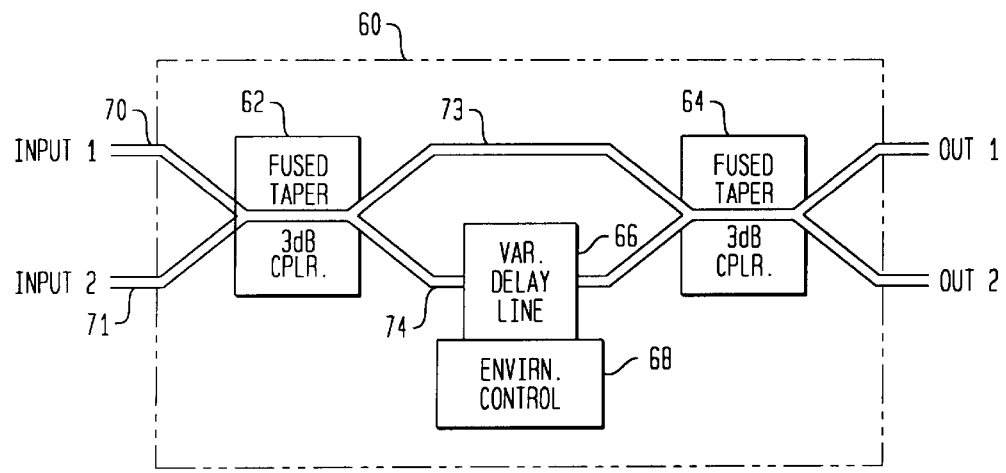
FIG. 6 shows a block diagram of an unbalanced Mach-Zehnder interferometer in accordance with a first embodiment of the present invention.

Referring now to FIG. 6, there is shown a block diagram of an unbalanced Mach-Zehnder interferometer 60 (shown within a dashed line rectangle) in accordance with a first embodiment of the present invention. It is to be understood that the arrangement of the unbalanced Mach-Zehnder interferometer 60 would be used, for example, for each of the unbalanced Mach-Zehnder interferometer 10a–10g in the cascaded DWD multiplexer/demultiplexer 30 of FIG. 3. The unbalanced Mach-Zehnder interferometer 60 comprises first and second fused tapered 3 dB couplers (FUSED TAPER. 3 dB CPLR.) 62 and 64, a variable delay line (VAR. DELAY LINE) 66 coupled with an environmental control (ENVIRN. CONTROL) 68. The first fused tapered coupler 62 is coupled to receive first and/or second optical input signals via optical waveguides 70 and 71, respectively. First and second optical output signals generated in the first fused tapered coupler 62 are coupled to (a) a first optical input of the second fused tapered coupler 64 via optical waveguide 73, and (b) an optical input of the variable delay line 66 via optical waveguide 74, respectively. An optical output signal from the variable delay line 66 is coupled to a second optical input of the second fused tapered coupler 64. The second fused tapered coupler 64 generates first and second optical output signals (OUT 1 and OUT 2) from the unbalanced Mach-Zehnder interferometer 60.

The unbalanced Mach-Zehnder interferometer 60 provides a general technique for overcoming signal drift problems by introducing the variable delay line 66 in one of the intermediate paths 73 or 74 of the interferometer 60. The delay provided in the variable delay line 66 can be controlled by sensing the environmental conditions (e.g., temperature) in the environmental control 68. The environmental control 68 then transmits appropriate control signals to the variable delay line 66 to maintain the relative delay between the paths 73 and 74 at a constant value. This avoids the condition graphically illustrated in FIG. 5.

Figure 7:
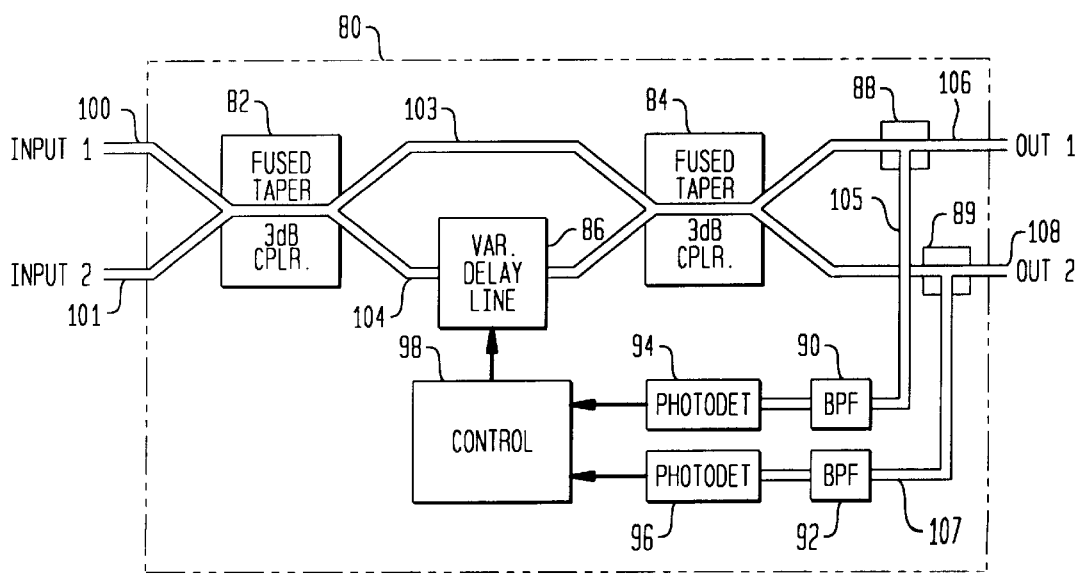
FIG. 7 shows a block diagram of an unbalanced Mach-Zehnder interferometer in accordance with a second embodiment of the present invention.

Referring now to FIG. 7, there is shown a block diagram of an unbalanced Mach-Zehnder interferometer 80 (shown within a dashed line rectangle) in accordance with a second embodiment of the present invention. In FIG. 7, bold solid lines represent optical paths while thinner solid lines represent electrical paths. It is to be understood that the arrangement of the unbalanced Mach-Zehnder interferometer 80 would be used, for example, for each of the unbalanced Mach-Zehnder interferometer 10a–10g in the cascaded DWD multiplexer/demultiplexer 30 of FIG. 3. The unbalanced Mach-Zehnder interferometer 80 comprises first and second fused tapered 3 dB couplers (FUSED TAPER. 3 dB CPLR.) 82 and 84, a variable delay line (VAR. DELAY LINE) 86, first and second optical taps 88 and 89, first and second bandpass filters (BPF) 90 and 92, first and second photodetectors (PHOTODETECT) 94 and 96, and a control 98. The first fused tapered coupler 82 is coupled to receive first and/or second optical input signals via optical waveguides 100 and 101, respectively. First and second optical output signals generated in the first fused tapered coupler 82 are coupled to (a) a first optical input of the second fused tapered coupler 84 via optical waveguide 103, and (b) an optical input of the variable delay line 86 via optical waveguide 104, respectively. An optical output signal from the variable delay line 86 is coupled to a second optical input of the second fused tapered coupler 84. The second fused tapered coupler 84 generates first and second optical output signals (OUT 1 and OUT 2) from the unbalanced Mach-Zehnder interferometer 80 via optical waveguides 106 and 108, respectively. The first and second optical taps 88 and 89 are coupled to divert a portion of the first and second optical output signals from the second fused tapered coupler 84 propagating in optical waveguides 106 and 108, respectively, to optical inputs of the respective first and second optical bandpass filters 90 and 92 via optical waveguides 105 and 107, respectively. Optical output signals from the first and second optical bandpass filters 90 and 92 are coupled to optical inputs of the first and second photodetectors 94 and 96, respectively. Electrical output control signals from the first and second photodetectors 94 and 96 are coupled to separate inputs of the control 98, and an electrical output from the control 98 is coupled to an second input of the variable delay line 86.

In operation, an optical input signal is received at one of the optical inputs (INPUT 1 or INPUT 2) of the first fused tapered coupler 82. The resultant optical output signals from the first fused tapered coupler 82 propagate in optical waveguides 103 and 104 to the first and second optical inputs of the second fused tapered coupler 84, with the variable delay line 86 interjecting a predetermined delay into the optical signal propagating in the optical waveguide 104. A portion of the resultant first and second optical output signals from the second fused tapered coupler 84 in optical waveguides 106 and 108 are diverted by the first and second optical taps 88 and 89, respectively, to the respective first and second optical bandpass filters 90 and 92. The first and second bandpass filters 90 and 92 have their response centered about two quadrature points which are out of phase by π radians. The resultant optical output signals from the first and second bandpass filters 90 and 92 are converted into corresponding electrical control signals by the first and second photodetectors 94 and 96, respectively. The electrical control signals from the first and second photodetectors 94 and 96 are used by the control 98 to generate appropriate electrical control signals to the variable delay line 86 for maintaining the relative delay between the paths 103 and 104 at a constant value.

The variable delay in either one of the unbalanced Mach-Zehnder interferometers 60 or 80 of FIGS. 5 and 6, respectively, can be generated by any suitable method. For example, if the unbalanced Mach-Zehnder (UMZ) interferometer 60 or 80 is made using optical fibers instead of using planar waveguides, one or both optical fibers can be coated with Piezo-Electric material which can be used to apply strain on the fiber(s) and thereby causing a relative phase shift to cancel phase drifts due to environmental temperature drifts. Alternatively, the optical fiber can be coated with a high resistance metal/material which can be forced to change its temperature due to an electric current through it from the control 68 or 98. Temperature changes in the waveguide can be used to maintain a fixed phase relationship in a planar waveguide version of the UMZ 60 or 80 by installing micro heaters around segments of the waveguide regions in the interferometers 60 or 80. Still further, it is possible to mount the UMZ 60 or 80 on a negative expansion material so that, as the temperature of the environment increases, a refractive index increase in the interferometer 60 or 80 is offset by a refractive index decrease in the interferometer 60 or 80 by strain relaxation.

It is to be appreciated and understood that the specific embodiments of the present invention described hereinbefore are merely illustrative of the general principles of the invention. Various modifications may be made by those skilled in the art which are consistent with the principles set forth.

What is claimed is:

1. An unbalanced Mach-Zehnder interferometer comprising:

first and second fused tapered couplers, each fused tapered coupler being responsive to the reception of at least one first and second optical input signals for generating separate predetermined first and second optical output signals, wherein the first and second output signals from the first fused tapered coupler are coupled via first and second optical waveguides, respectively, to respective first and second optical inputs of the second fused tapered coupler, and first and second output signals from the second fused tapered coupler are provided as first and second output signals from the unbalanced Mach-Zehnder interferometer; and variable delay providing means coupled in one of the first and second waveguides coupling the first and second optical output signals from the first fused tapered coupler to the first and second optical inputs of the second fused tapered coupler for introducing a predetermined variable delay into an optical signal passing therethrough for maintaining a relative delay between the first and second waveguides at a constant value.

2. The unbalanced Mach-Zehnder interferometer of claim 1 wherein the first and second waveguides coupling the first and second optical outputs from the first fused tapered coupler to the first and second optical inputs, respectively, of the second fused tapered coupler are optical fibers.

3. The unbalanced Mach-Zehnder interferometer of claim 1 wherein the first and second waveguides coupling the first and second optical outputs from the first fused tapered coupler to the first and second optical inputs of the second fused tapered coupler are planar waveguides.

4. The unbalanced Mach-Zehnder interferometer of claim 1 further comprising:
   an environmental control for detecting changes in the environment around the unbalanced Mach-Zehnder interferometer and generating output control signals to the variable delay providing means corresponding to detected changes in the environment; and
   the variable delay providing means is responsive to the output control signals from the environmental control for maintaining the relative delay between the first and second waveguides coupling the first and second optical outputs from the first fused tapered coupler to the first and second optical inputs of the second fused tapered coupler at a constant value.

5. The unbalanced Mach-Zehnder interferometer of claim 1 further comprising:
   first and second optical taps for directing a portion of the first and second output signals from the second fused tapered coupler along first and second optical paths, respectively;
   first and second optical bandpass filters for receiving the portions of the first and second output signals, respectively, from the respective first and second optical taps, each bandpass filter being arranged to pass a predetermined band of wavelengths at a relative predetermined phase as an optical output signal thereof;
   a control device responsive to the output signals from each of the first and second optical bandpass filters for generating corresponding control signals to the variable delay providing means; and
   the variable delay providing means being responsive to the output control signals from the control device for maintaining a relative delay between the first and second waveguides coupling the first and second optical outputs from the first fused tapered coupler to the first and second optical inputs of the second fused tapered coupler at a constant value.

6. The unbalanced Mach-Zehnder interferometer of claim 5 further comprising first and second photodetectors for receiving the optical output signals from the first and second optical bandpass filters, respectively, and generating respective corresponding first and second electrical output signals to the control device.

7. An optical wavelength division multiplexer or demultiplexer comprising a plurality of unbalanced Mach-Zehnder interferometers located in a plurality of stages of a cascading arrangement, each unbalanced Mach-Zehnder interferometer comprising:
   a first fused tapered coupler responsive to the reception of at least one of first and second optical input signals for generating separate predetermined first and second optical output signals for transmission via first and second optical waveguides, respectively;
   a second fused tapered coupler responsive to the reception of the first and second optical output signals from the first fused tapered coupler which are received at first and second optical inputs, respectively, from the respective first and second optical waveguides, for generating separate predetermined first and second optical output signals from the unbalanced Mach-Zehnder interferometer; and
   variable delay providing means coupled in one of the first and second waveguides coupling the output signals from the first fused tapered coupler to the first and second optical inputs of the second fused tapered coupler for introducing a predetermined variable delay into the associated optical output signal from the first fused tapered coupler passing therethrough for maintaining a relative delay between the first and second waveguides at a constant value.

8. The optical wavelength division multiplexer or demultiplexer of claim 7 wherein the first and second waveguides coupling the optical output signals from the first fused tapered coupler to the first and second optical inputs, respectively, of the second fused tapered coupler are optical fibers.

9. The optical wavelength division multiplexer or demultiplexer of claim 7 wherein the first and second waveguides coupling the optical output signals from the first fused tapered coupler to the first and second optical inputs of the second fused tapered coupler in each Mach-Zehnder interferometer are planar waveguides.

10. The optical wavelength division multiplexer or demultiplexer of claim 7 wherein each unbalanced Mach-Zehnder interferometer further comprises:
    an environmental control for detecting changes in the environment around the unbalanced Mach-Zehnder interferometer and generating output control signals to the variable delay providing means corresponding to detected changes in the environment; and
    the variable delay providing means being responsive to the output control signals from the environmental control for maintaining a relative delay between the first and second waveguides coupling the first and second optical outputs from the first fused tapered coupler to the first and second optical inputs of the second fused tapered coupler at a constant value.

11. The optical wavelength division multiplexer or demultiplexer of claim 7 wherein each unbalanced Mach-Zehnder interferometer further comprises:
    first and second optical taps for directing a portion of the first and second output signals, respectively, from the second fused tapered coupler along respective first and second optical paths;
    first and second optical bandpass filters for receiving the portions of the first and second output signals, respectively, from the respective first and second optical taps, each bandpass filter being arranged to pass a predetermined band of wavelengths as an optical output signal thereof which is at a relative predetermined phase to that of the other bandpass filter;
    a control device responsive to the output signals from each of the first and second optical bandpass filters for generating corresponding control signals to the variable delay providing means; and
    the variable delay providing means is responsive to the output control signals from the control device for maintaining a relative delay between the first and second waveguides coupling the first and second optical outputs from the first fused tapered coupler to the first and second optical inputs of the second fused tapered coupler at a constant value.

12. The optical wavelength division multiplexer or demultiplexer of claim 11 wherein each unbalanced Mach- Zehnder interferometer further comprises first and second photodetectors for receiving the optical output signals from the first and second optical bandpass filters, respectively, and generating respective corresponding first and second electrical output signals to the control device.

13. The optical wavelength division multiplexer or demultiplexer of claim 7 wherein:

a first stage of the optical wavelength division multiplexer or demultiplexer comprises a first unbalanced Mach-Zehnder interferometer coupled to receive at least one of first and second optical input signals, introduce a predetermined variable delay to effect a relative optical path length between first and second optical waveguides within the first unbalanced Mach-Zehnder interferometer, and to generate the first and second output signals from the first unbalanced Mach-Zehnder interferometer; and a second stage of the optical wavelength division multiplexer or demultiplexer comprises second and third unbalanced Mach-Zehnder interferometers wherein:

the second unbalanced Mach-Zehnder interferometer is coupled to receive the first optical output signal from the first unbalanced Mach-Zehnder interferometer, introduce a predetermined variable delay to effect a relative optical path length between first and second optical waveguides within the second unbalanced Mach-Zehnder interferometer, and to generate the first and second output signals from the second unbalanced Mach-Zehnder interferometer; and the third unbalanced Mach-Zehnder interferometer is coupled to receive the second optical output signal from the first unbalanced Mach-Zehnder interferometer, introduce a predetermined variable delay to effect a relative optical path length between first and second optical waveguides within the third unbalanced Mach-Zehnder interferometer, and to generate the first and second output signals from the third unbalanced Mach-Zehnder interferometer.

14. A method of providing an unbalanced Mach-Zehnder interferometer that compensates for signal drift comprising the steps of:

(a) receiving at least one of first and second optical input signals at a first fused tapered coupler and generating separate predetermined first and second optical output signals for transmission via first and second optical waveguides, respectively;

(b) receiving the first and second optical output signals generated by the first fused tapered coupler instep (a) at first and second optical inputs, respectively, of a second fused tapered coupler from the respective first and second optical waveguides, and generating separate predetermined first and second optical output signals from the unbalanced Mach-Zehnder interferometer; and (c) introducing a predetermined variable delay into one of the first and second optical output signal from the first fused tapered coupler generated in step (a) in a variable delay providing means for maintaining a relative delay between the first and second waveguides coupling the first and second output signals from the first fused tapered coupler to the first and second optical inputs of the second fused tapered coupler at a constant value.

15. The method of claim 14 wherein in performing step (c) performing the substeps of:

(c1) detecting changes in the environment around the unbalanced Mach-Zehnder interferometer in an environmental control and generating output control signals to the variable delay providing means corresponding to detected changes in the environment; and (c2) maintaining the relative delay between the first and second waveguides coupling the first and second optical outputs from the first fused tapered coupler to the first and second optical inputs of the second fused tapered coupler at a constant value by the variable delay providing means in response to the output control signals generated by the environmental control in step (c1).

16. The method of claim 14 wherein in performing step (c) performing the substeps of:

(c1) directing a portion of the first and second output signals from the second fused tapered coupler along first and second optical paths by first and second optical taps, respectively;

(c2) receiving the portions of the first and second output signals, respectively, from the respective first and second optical taps in respective first and second optical bandpass filters, each bandpass filter passing a predetermined band of wavelengths at a relative predetermined phase as an optical output signal thereof;

(c3) generating corresponding control signals in a control device in response to the output signals from each of the first and second optical bandpass filters in step (c2) for transmission to the variable delay providing means; and (c4) the variable delay providing means maintaining a relative delay between the first and second waveguides coupling the first and second optical outputs from the first fused tapered coupler to the first and second optical inputs of the second fused tapered coupler at a constant value in response to the output control signals from the control device of step (c3).

17. The method of claim 16 wherein prior to performing step (c3), performing the substeps of:

(c5) receiving the optical output signals from the first and second optical bandpass filters in first and second photodetectors, respectively, and generating respective corresponding first and second electrical output signals to the control device.

* * * * *